(12) United States Patent
Matsuda et al.

(10) Patent No.: US 11,135,876 B2
(45) Date of Patent: Oct. 5, 2021

(54) PNEUMATIC TIRE

(71) Applicant: The Yokohama Rubber Co., LTD., Tokyo (JP)

(72) Inventors: Jun Matsuda, Hiratsuka (JP); Yuji Satoh, Hiratsuka (JP); Yuji Kodama, Hiratsuka (JP)

(73) Assignee: The Yokohama Rubber Co., LTD.

( * ) Notice: Subject to any disclaimer, the term of this patent is extended or adjusted under 35 U.S.C. 154(b) by 222 days.

(21) Appl. No.: 16/300,926

(22) PCT Filed: May 12, 2017

(86) PCT No.: PCT/JP2017/018047
§ 371 (c)(1),
(2) Date: Nov. 12, 2018

(87) PCT Pub. No.: WO2017/195889
PCT Pub. Date: Nov. 16, 2017

(65) Prior Publication Data
US 2019/0152262 A1    May 23, 2019

(30) Foreign Application Priority Data

May 12, 2016   (JP) .............................. JP2016-095767

(51) Int. Cl.
*B60C 9/06*      (2006.01)
*B60C 9/07*      (2006.01)
(Continued)

(52) U.S. Cl.
CPC ................. *B60C 9/06* (2013.01); *B60C 9/02* (2013.01); *B60C 9/07* (2013.01); *B60C 9/08* (2013.01);
(Continued)

(58) Field of Classification Search
CPC ........ B60C 9/06–09; B60C 2009/0425; B60C 2009/2016; B60C 2009/2019
See application file for complete search history.

(56) References Cited

U.S. PATENT DOCUMENTS 3,442,315 A * 5/1969 Mirtain ................. B29D 30/22
                                                  152/556
3,580,318 A * 5/1971 Menell ..................... B60C 9/28
                                                  152/526
(Continued)

FOREIGN PATENT DOCUMENTS

CN        1767959      5/2006
JP       H03-292202   12/1991
(Continued)

OTHER PUBLICATIONS

International Search Report for International Application No. PCT/JP2017/018047 dated Jul. 25, 2017, 4 pages, Japan.

*Primary Examiner* — Jacob T Minskey
*Assistant Examiner* — Virak Nguon
(74) *Attorney, Agent, or Firm* — Thorpe North & Western

(57) ABSTRACT

Provided is a pneumatic tire including a belt layer. When the tread region indicates a region corresponding to a belt width of the belt layer and the side region indicates a region inward of a tire radial direction with respect to a tire maximum width position, the carcass cords forming the carcass layer are inclined with respect to the tire radial direction in the tread region, and at the same time, extend along the tire radial direction in the side region. The carcass cords forming the carcass layer and belt cords forming the belt layer cross with each other in the tread region.

10 Claims, 3 Drawing Sheets

(51) Int. Cl.
  *B60C 9/09*    (2006.01)
  *B60C 9/18*    (2006.01)
  *B60C 9/08*    (2006.01)
  *B60C 9/02*    (2006.01)
  *B60C 9/20*    (2006.01)
  *B60C 9/04*    (2006.01)

(52) U.S. Cl.
  CPC .............. *B60C 9/09* (2013.01); *B60C 9/18* (2013.01); *B60C 9/20* (2013.01); *B60C 2009/0425* (2013.01); *B60C 2009/2016* (2013.01); *B60C 2009/2019* (2013.01)

(56) References Cited

U.S. PATENT DOCUMENTS

| | | | |
|---|---|---|---|
| 2002/0046796 A1 | 4/2002 | Hitotsuyanagi et al. | |
| 2002/0096244 A1* | 7/2002 | Ahouanto | B60C 9/26 156/127 |
| 2005/0067081 A1 | 3/2005 | Nakakura et al. | |
| 2005/0067107 A1 | 3/2005 | Hitotsuyanagi et al. | |
| 2006/0124222 A1 | 6/2006 | Hitotsuyanagi et al. | |
| 2006/0169378 A1 | 8/2006 | Akiyama | |
| 2014/0124117 A1* | 5/2014 | Urata | B60C 9/06 152/535 |
| 2015/0298510 A1* | 10/2015 | Shimizu | B60C 15/0027 152/541 |
| 2015/0314644 A1* | 11/2015 | Grassi | B60C 1/00 152/537 |

FOREIGN PATENT DOCUMENTS

| | | |
|---|---|---|
| JP | 2002-144446 | 5/2002 |
| JP | 2002-326505 | 11/2002 |
| JP | 2003-505279 | 2/2003 |
| JP | 2005-022537 | 1/2005 |
| JP | 2009-227229 | 10/2009 |
| JP | 2009227229 A * | 10/2009 |
| JP | 2010-000993 | 1/2010 |
| JP | 2010-274796 | 12/2010 |
| JP | 2013-216113 | 10/2013 |
| WO | WO 01/08873 | 2/2001 |
| WO | WO 2004/089657 | 10/2004 |

* cited by examiner

PNEUMATIC TIRE

TECHNICAL FIELD

The present technology relates to a pneumatic tire and more particularly relates to a pneumatic tire including a belt layer, in which a carcass layer shares a function of the belt layer to achieve a single-ply belt layer by employing a curved carcass structure in which an angle of a carcass cord continuously changes in a tread region and side regions so that the pneumatic tire can maintain good steering stability and achieve reduction in tire weight.

BACKGROUND ART

Generally, as a method of reducing weight of a tire, the thickness is reduced of rubber used for, for example, a cap tread and sides, which are portions of the tire large in area. However, from the perspective of wear resistance and durability, it is difficult to achieve further reduction in weight with the method of reducing the thickness of each portion of the tire.

Meanwhile, for reduction in weight of the tire, there have been proposed various types of a tire which does not require an independent belt layer of a related-art radial structure. For example, in Japan Unexamined Patent Publication No. 2005-22537, the following pneumatic tire can be obtained. That is, in each of an inner side cord layer and an outer side cord layer, a large number of cords are arrayed in parallel with each other. A cord angle in each cord layer is set to a range from 80° to 90° in sidewall portions and to a range from 15° to 50° in a center of a tread portion, and the cords are tilted reversely with each other between both the cords layers. As a result, the pneumatic tire can have both an internal-pressure retaining function and a hoop function without a belt layer. However, when the belt layer is completely removed from the tread portion, there is a problem in that steering stability cannot sufficiently be secured.

SUMMARY

The present technology provides a pneumatic tire including a belt layer, in which a carcass layer shares a function of the belt layer to achieve a single-ply belt layer by employing a curved carcass structure in which an angle of a carcass cord continuously changes in a tread region and side regions so that the pneumatic tire can maintain good steering stability and achieve reduction in tire weight.

An embodiment of the present technology is a pneumatic tire including a carcass layer and a belt layer. The carcass layer having at least one layer includes a plurality of carcass cords mounted between a pair of bead portions. The belt layer having a single layer is positioned on an outer peripheral side of the carcass layer of a tread portion, and includes a plurality of belt cords inclined with respect to a tire circumferential direction. When a tread region indicates a region corresponding to a belt width of the belt layer and a side region indicates a region inward in a tire radial direction from a tire maximum width position, the carcass cords forming the carcass layer are inclined with respect to a tire radial direction in the tread region and extend along the tire radial direction in the side region. The carcass cords forming the carcass layer and the belt cords forming the belt layer cross with each other in the tread region.

In the present technology, when the tread region indicates a region corresponding to the belt width of the belt layer and the side region indicates a region inward of the tire radial direction with respect to the tire maximum width position, the carcass cords of the carcass layer are inclined with respect to the tire radial direction in the tread region, and at the same time, extend along the tire radial direction in the side region. The carcass cords of the carcass layer and the belt cords of the belt layer are arranged to cross with each other in the tread region. With this structure, the carcass layer can share the function of the belt layer, and the belt layer can be reduced to a single-ply layer as compared to the related-art pneumatic tire including the two belt layers. As a result, the reduction in tire weight can be achieved. Further, in the tread region, the structure in which the carcass cords and the belt cords cross with each other is employed. Thus, the rigidity of the tread portion can sufficiently be secured, and the good steering stability can be exerted.

Further, the cord angle in the carcass layer with respect to the tire circumferential direction is preferably set in the following manner. That is, the cord angle falls within a range from 10° to 75° in the tread central region corresponding to 80% of the center of the belt width of the belt layer, is gradually increased as approaching outward in the tire width direction with respect to the edge of the belt layer, and falls within a range from 85° to 90° in the side region. Thus, the carcass layer can sufficiently share the function as the belt layer. Further, the carcass cords are allowed to be gently changed in angle between the tread region and the side region, and hence the durability can be improved. More preferably, the cord angle preferably falls within a range from 15° to 70° and more preferably a range from 15° to 65° in the tread central region.

In the present technology, it is preferred that the cord angle in the belt layer with respect to the tire circumferential direction fall within a range from 15° to 45°. Thus, the belt layer can be caused to have the hoop function required as the belt layer.

In the present technology, it is preferred that a cord count per unit width, which is 50 mm, for the carcass cords forming the carcass layer at least in the tread region be from twenty to seventy, and that a diameter of each of the carcass cords fall within a range from 0.2 mm to 1.5 mm. Thus, increase in mass of the carcass layer is suppressed, which contributes to reduction in weight of the tire. At the same time, degradation in rigidity and durability can be suppressed.

In the present technology, it is preferred that an intermediate rubber layer having a thickness from 0.2 mm to 2.0 mm be arranged between the carcass layer and the belt layer. Thus, degradation in out-of-plane flexural rigidity of the tread region can be complemented, and plane flexural rigidity of the tread region can be improved.

In the present technology, it is preferred that a belt reinforcing layer be provided outward in the tire radial direction of the belt layer. Thus, high-speed durability can be improved.

DETAILED DESCRIPTION

Figure 1:
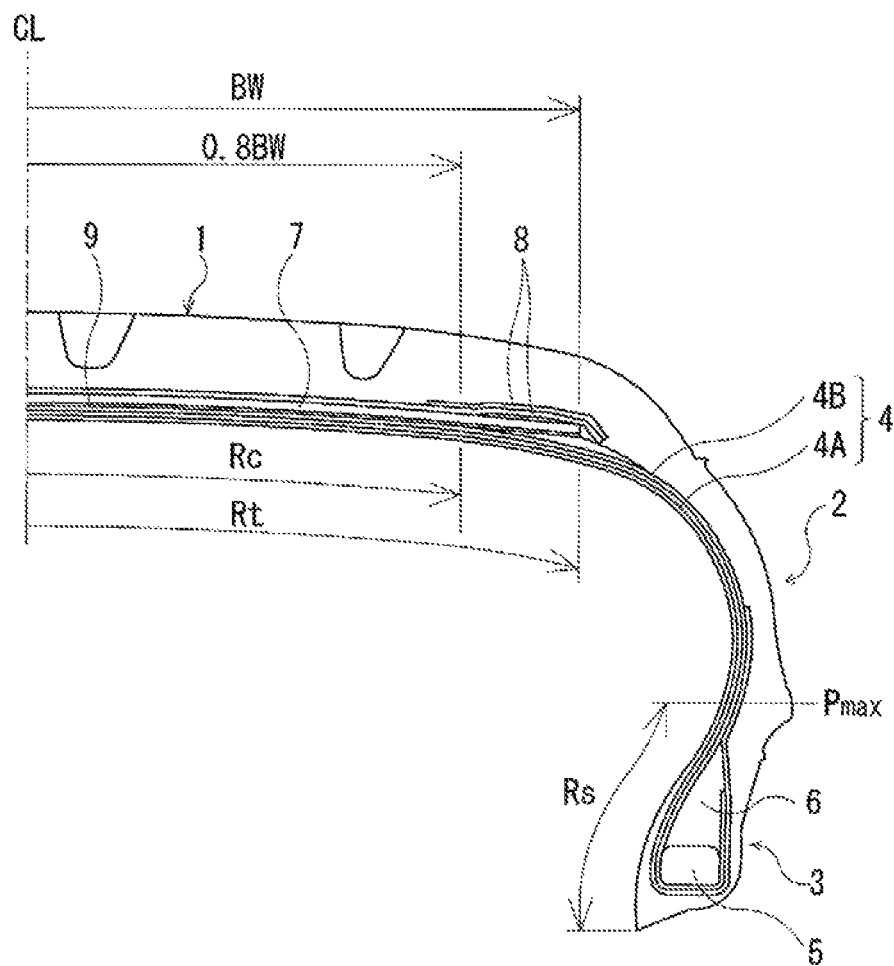
FIG. 1 is a meridian cross-sectional view illustrating a pneumatic tire according to an embodiment of the present technology.
Figure 2:
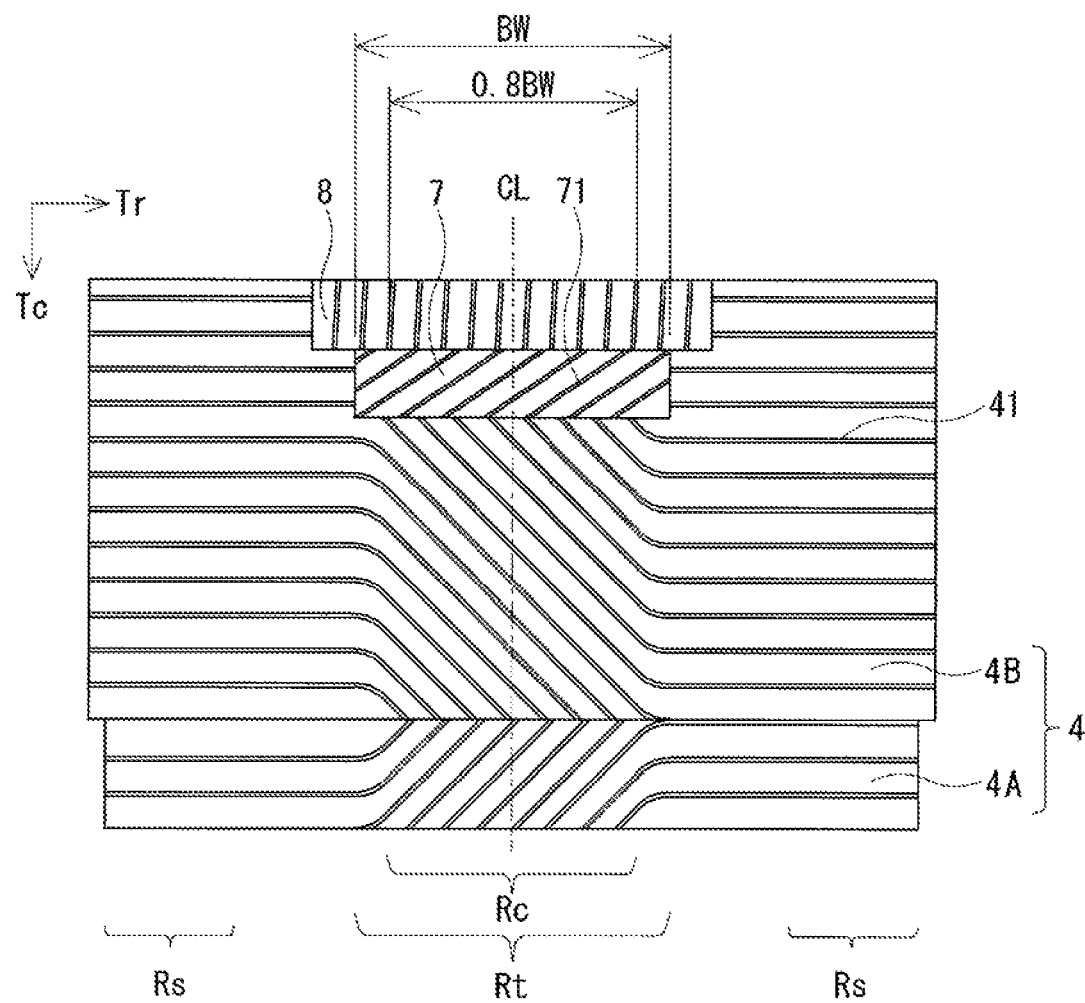
FIG. 2 is a plan view in which a carcass layer, a belt layer, and a belt reinforcing layer of the pneumatic tire according to the embodiment of the present technology are extracted and illustrated.

Now, with reference to the accompanying drawings, detailed description is made of the configuration of the present technology. FIG. 1 and FIG. 2 are illustrations of a pneumatic tire according to an embodiment of the present technology. Note that, the line CL indicates a tire center line in FIG. 1 and FIG. 2.

As illustrated in FIG. 1, the pneumatic tire of the present embodiment includes a tread portion 1 extending in a tire circumferential direction to have an annular shape, a pair of sidewall portions 2 and 2 arranged on both sides of the tread portion 1, and a pair of bead portions 3 and 3 arranged inward of the sidewall portions 2 in a tire radial direction.

Two layers of a carcass layer 4 are mounted between the pair of bead portions 3, 3. In the tread portion 1, the carcass layer 4 includes a carcass layer 4A arranged on a tire inner circumferential side and a carcass layer 4B arranged on a tire outer circumferential side. Each of the carcass layers 4A and 4B includes a plurality of carcass cords 41 extending in the tire radial direction, and is folded back around bead cores 5 arranged in each of the bead portions 3 from a tire inner side to a tire outer side. A bead filler 6, which has a triangular cross-sectional shape and is formed from rubber composition, is arranged on the outer circumference of the bead core 5. Of the carcass layer 4 having a double structure, the carcass layer 4B is terminated in the middle of the bead filler 6, and the carcass layer 4A covers the bead filler 6 so as to be wrapped. Further, the carcass layer 4A extends to a vicinity of a shoulder portion of the tread portion 1, and then is terminated.

Meanwhile, a belt layer 7 having a single layer is embedded on an outer circumferential side of the carcass layer 4 in the tread portion 1. The belt layer 7 includes a plurality of belt cords 71 that are inclined with respect to the tire circumferential direction. As the belt cords 71 of the belt layer 7, steel cords or organic fiber cords of nylon, aramid, or the like are preferably used.

For the purpose of improving high-speed durability, a belt reinforcing layer 8 is arranged on an outer circumferential side of the belt layer 7. The belt reinforcing layer 8 has a plurality of (two in FIG. 1) layers in which fiber cords are oriented in the tire circumferential direction. The belt reinforcing layer 8 may have, for example, a jointless structure in which a strip material formed by aligning at least one rubber-coated fiber cord is spirally wound in the tire circumferential direction. A cord angle of the belt reinforcing layer 8 with respect to the tire circumferential direction is 5° or less and more preferably 3° or less. As the fiber cord of the belt reinforcing layer 8, there are suitably used an organic fiber cord of, for example, polyethylene terephthalate (PET), polyethylene naphthalate (PEN), nylon, rayon, or aramid, an aramid fiber cord with high elasticity, or a composite cord in which an aramid fiber with high elasticity and a nylon fiber with low elasticity are intertwined. Note that, in the mode in FIG. 1, a portion of the belt reinforcing layer 8, which is positioned inward in the tire radial direction, forms a full cover for covering the entire width of the belt layer 7, and portions of the belt reinforcing layer 8, which are positioned outward in the tire radial direction, form edge cover layers for covering only edges of the belt layer 7.

Further, an intermediate rubber layer 9 is arranged between the carcass layer 4 and the belt layer 7. It is preferred that the intermediate rubber layer 9 have a modulus of 10 MPa or greater and a dissipation factor (tan δ) of 0.2 or less at 60° C. Further, short fibers may be blended in a rubber sheet forming the intermediate rubber layer 9, but long fibers are excluded. A thickness of the intermediate rubber layer 9 may be formed to fall within a range from 0.2 mm to 2.0 mm. When the thickness of the intermediate rubber layer 9 is appropriately set as described above, degradation in out-of-plane flexural rigidity of the tread region Rt can be complemented, and plane flexural rigidity of the tread region Rt can be improved.

A belt width BW indicates a width of the belt layer 7 in the tire radial direction. As illustrated in FIG. 1 and FIG. 2, a tread region Rt indicates a region corresponding to the belt width BW of the belt layer 7, and a side region Rs indicates at least a region inward in the tire radial direction from a tire maximum width position $P_{max}$. Further, a tread central region Rc indicates a region corresponding to 80% of a center of the belt width BW of the belt layer 7. Note that, in FIG. 2, Tr indicates the tire radial direction, and Tc indicates the tire circumferential direction.

The carcass cords 41 forming the carcass layer 4 are inclined with respect to the tire radial direction, that is, the tire width direction in the tread region Rt, and at the same time, are arranged to extend along the tire radial direction in the side region Rs. In the mode in FIG. 2, the carcass cords 41 in both the carcass layers 4A and 4B are inclined with respect to the tire radial direction in the tread region Rt. However, the following structure may be employed. That is, the carcass cords 41 in one of the carcass layers 4A and 4B are inclined with respect to the tire width direction in the tread region Rt, and the carcass cords 41 in the other of the carcass layers 4A and 4B are arranged to extend along the tire radial direction in the tread region Rt and the side region Rs. That is, the present technology has the structure in which the carcass cords 41 in at least one of the carcass layers 4A and 4B are arranged to be inclined with respect to the tire width direction in the tread region Rt.

The belt cords 71 forming the belt layer 7 are inclined in the same direction with respect to the tire radial direction in the tread region Rt. In the tread region Rt, the carcass cords 41 and the belt cords 71 are arranged to cross with each other. In the mode in FIG. 2, the carcass cords 41 in the carcass layer 4B and the belt cords 71 cross with each other. The present technology has the structure in which, in the tread region Rt, the carcass cords 41 in at least one of the carcass layers 4A and 4B and the belt cords 71 are arranged to cross with each other. However, the following cases are not included: a case where the carcass cords 41 of both the carcass layers 4A and 4B and the belt cords 71 extend to be parallel with each other in the same direction in the tread region Rt; and a case where the carcass cords 41 of one of the carcass layers 4A and 4B are arranged to extend along the tire radial direction in the tread region Rt and the side region Rs and the carcass cords 41 in the other one of the carcass layers 4A and 4B and the belt cords 71 extend to be parallel with each other in the same direction in the tread region Rt.

In the above-mentioned pneumatic tire, the carcass cords 41 of the carcass layer 4 are inclined with respect to the tire radial direction in the tread region Rt and extend along the tire radial direction in the side region Rs, and the carcass cords 41 of the carcass layer 4 and the belt cords 71 of the belt layer 7 are arranged to cross with each other in the tread region Rt. With this structure, the carcass layer 4 can share the function of the belt layer 7, and the belt layer 7 can be reduced to a single-ply layer as compared to the related-art pneumatic tire including two belt layers. As a result, the reduction in tire weight can be achieved. Further, in the tread region Rt, the structure in which the carcass cords 41 and the belt cords 71 cross with each other is employed. Thus, the rigidity of the tread portion 1 can sufficiently be secured, and the good steering stability can be exerted.

Figure 3:
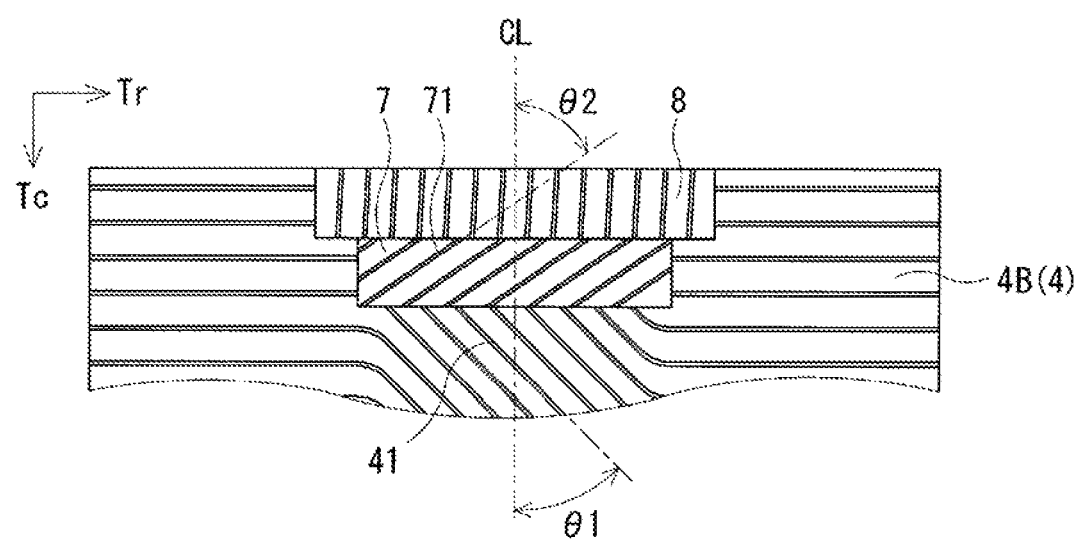
FIG. 3 is a plan view partially illustrating the carcass layer, the belt layer, and the belt reinforcing layer in FIG. 2 for the purpose of defining cord angles of carcass cords and belt cords.

As illustrated in FIG. 3, an angle of the carcass cords 41 in the carcass layer 4 with respect to the tire circumferential direction is indicated as a cord angle θ1. The cord angle θ1 indicates an average angle in each of the tread central region Rc and the side region Rs. Further, the cord angle θ1 is preferably set in the following manner. That is, the cord angle θ1 is gradually increased as approaching outward in the tire width direction from the tread central region with respect to the edge of the belt layer 7, and is set to approximately 90° in the side region Rs. Further, in the mode in FIG. 2, there is exemplified the case where the cord angle θ1 in the carcass layer 4A and the cord angle θ1 in the carcass layer 4B are different from each other in the tread central region Rc, and where the carcass cords 41 in the carcass layer 4A and the carcass cords 41 in the carcass layer 4B are arranged to be orthogonal with each other in the tread central region Rc. However, the carcass cords 41 may be arranged to have the same cord angle θ1 in the carcass layers 4A and 4B in the tread central region Rc.

Further, the cord angle θ1 is preferably set in the following manner. That is, the cord angle θ1 falls within a range from 10° to 75° in the tread central region Rc, is gradually increased as approaching outward of the tire width direction with respect to the edge of the belt layer 7, and falls within a range from 85° to 90° in the side region Rs. Particularly, in the tread central region Rc, the cord angle θ1 preferably falls within a range from 15° to 70° and more preferably a range from 15° to 65°. When the cord angle θ1 is appropriately set as described above, the carcass layer 4 can sufficiently share the function as the belt layer 7. Further, the carcass cords 41 are allowed to be gently changed in angle between the tread region Rt and the side region Rs, and hence the durability can be improved.

Further, as illustrated in FIG. 3, an angle of the belt cords 71 forming the belt layer 7 with respect to the tire circumferential direction is indicated as a cord angle θ2. The cord angle θ2 preferably falls within a range from 15° to 45°. When the cord angle θ2 is appropriately set as described above, the belt layer 7 can be caused to have the hoop function required as the belt layer.

In the present technology, a cord count per unit width, which is 50 mm, for the carcass cords 41 at least in the tread region Rt is preferably from twenty to seventy, and a diameter of the carcass cord 41 preferably falls within a range from 0.2 mm to 1.5 mm. When a dimension of the carcass cord 41 is appropriately set as described above, increase in mass of the carcass layer 4 is suppressed, which contributes to reduction in weight of the tire. At the same time, degradation in rigidity and durability can be suppressed.

EXAMPLES

A tire for each of Examples 1 to 4 was manufactured in the following manner. The pneumatic tire had a tire size of 235/40R18, and included two carcass layers, and a single belt layer. The carcass layers included a plurality of carcass cords mounted between a pair of bead portions. The belt layer was positioned on an outer peripheral side of the carcass layers of a tread portion, and included a plurality of belt cords inclined with respect to a tire circumferential direction. Also, the carcass cords forming the carcass layers were inclined with respect to the tire radial direction in a tread region, and extended along the tire radial direction in a side region. The carcass cords forming the carcass layers and the belt cords forming the belt layer cross with each other in the tread region.

In each of Examples 1 to 4, as shown in Table 1, the cord angle in the inner carcass layer in the tread central region, the cord angle in the inner carcass layer in the side region, the cord angle in the outer carcass layer in the tread central region, the cord angle in the outer carcass layer in the side region, and the cord angle in the belt layer, were set. The respective cord angles were inclination angles with respect to the tire circumferential direction.

For the purpose of comparison, a tire of a related-art example, which included two carcass layers in which carcass cords were oriented in the tire radial direction and two belt layers, was prepared. In the conventional example, the inner belt layer and the outer belt layer had the cord angle of 24° and the cord angle of −24°, respectively. Further, a tire of Comparative Example having the same configuration of Example 2 except for that the belt layer was not provided was prepared.

The test tires were evaluated for tire weight, rolling resistance, and steering stability according to the following evaluation methods, and results are shown in Table 1.

Tire Weight

The weight of each test tire was measured. Evaluation results are expressed as index values with the value of the conventional example being defined as 100. Smaller index values indicate lower tire weight.

Rolling Resistance

Each test tire was assembled on a wheel having a rim size of 18×8.5 J, and was inflated to an air pressure of 230 kPa. Then, according to the ISO standard, the rolling resistance was measured through use of a drum test device having a drum diameter of 2000 mm. Evaluation results are expressed as index values with the value of the conventional example being defined as 100. Smaller index values indicate less rolling resistance.

Steering Stability

Each test tire was assembled on a wheel having a rim size of 18×8.5 J, and mounted to a vehicle having a displacement of 2400 cc. Then, under a condition of an air pressure of 230 kPa, sensory evaluations were performed by a test driver on steering stability. Evaluation results are expressed by a grading scale out of 10 with 5 as a reference point. Larger evaluation scores indicate superior steering stability.

TABLE 1

|  | Conventional Example | Comparative Example | Example 1 | Example 2 | Example 3 | Example 4 |
|---|---|---|---|---|---|---|
| Cord angle in inner carcass layer in tread central region | 90° | −60° | −60° | −60° | −45° | −45° |

TABLE 1-continued

|  | Conventional Example | Comparative Example | Example 1 | Example 2 | Example 3 | Example 4 |
|---|---|---|---|---|---|---|
| Cord angle in inner carcass layer in side region | 90° | 90° | 90° | 90° | 90° | 90° |
| Cord angle in outer carcass layer in tread central region | 90° | 60° | −60° | 60° | −45° | 45° |
| Cord angle in outer carcass layer in side region | 90° | 90° | 90° | 90° | 90° | 90° |
| Cord angle in belt layer | 24°/−24° | — | 24° | 24° | 24° | 24° |
| Tire weight | 100 | 92 | 94 | 94 | 94 | 94 |
| Rolling resistance | 100 | 103 | 98 | 96 | 97 | 95 |
| Steering stability | 5 | 4 | 5 | 5 | 5 | 5 |

As apparent from Table 1, in each of the tires of Examples 1 to 4, the carcass cords forming the carcass layers were inclined with respect to the tire radial direction in the tread region, and at the same time, extended along the tire radial direction in the side region. The carcass cords forming the carcass layers and the belt cords forming the belt layer cross with each other in the tread region. With this structure, in the tires in Examples 1 to 4, the steering stability equivalent to that in the related-art was maintained, the tire weight was reduced, and the rolling resistance was improved.

Meanwhile, in Comparative Example, the good tire weight was achieved. However, the belt layer is not provided, and hence the out-of-plane bending rigidity of the tread region was insufficient to increase a ground contact length. Accordingly, the rolling resistance is degraded, and the plane bending rigidity is reduced to degrade the steering stability.

The invention claimed is:

1. A pneumatic tire, comprising:
a carcass layer having a plurality of layers, each of which includes a plurality of carcass cords mounted between a pair of bead portions;
a belt layer having a single layer, which is positioned on an outer peripheral side of the carcass layer of a tread portion and includes a plurality of belt cords inclined with respect to a tire circumferential direction; and
a belt reinforcing layer provided outward in a tire radial direction of the belt layer and having a greater width in a tire width direction than a belt width of the belt layer in the tire width direction, a cord angle of fiber cords in the belt reinforcing layer being 5° or less with respect to the tire circumferential direction, wherein
when a tread region indicates a region corresponding to the belt width of the belt layer and a side region indicates a region inward in the tire radial direction from a tire maximum width position, the carcass cords forming the carcass layer are inclined with respect to a tire radial direction in the tread region and extend along the tire radial direction in the side region, and
the carcass cords forming the carcass layer and the plurality of belt cords forming the belt layer cross with each other in the tread region.

2. The pneumatic tire according to claim 1, wherein a cord angle in the carcass layer with respect to the tire circumferential direction falls within a range from 10° to 75° in a tread central region corresponding to 80% of a center of the belt width of the belt layer, is gradually increased as approaching outward in the tire width direction with respect to an edge of the belt layer, and falls within a range from 85° to 90° in the side region.

3. The pneumatic tire according to claim 2, wherein a cord angle in the belt layer with respect to the tire circumferential direction falls within a range from 15° to 45°.

4. The pneumatic tire according to claim 3, wherein
a cord count per unit width, which is 50 mm, for the plurality of carcass cords forming the carcass layer at least in the tread region is from twenty to seventy, and
a diameter of each of the plurality of carcass cords falls within a range from 0.2 mm to 1.5 mm.

5. The pneumatic tire according to claim 4, further comprising an intermediate rubber layer, which has a thickness of from 0.2 mm to 2.0 mm and is arranged between the carcass layer and the belt layer.

6. The pneumatic tire according to claim 5, further comprising a belt reinforcing layer provided outward in the tire radial direction of the belt layer.

7. The pneumatic tire according to claim 1, wherein a cord angle in the belt layer with respect to the tire circumferential direction falls within a range from 15° to 45°.

8. The pneumatic tire according to claim 1, wherein
a cord count per unit width, which is 50 mm, for the plurality of carcass cords forming the carcass layer at least in the tread region is from twenty to seventy, and
a diameter of each of the plurality of carcass cords falls within a range from 0.2 mm to 1.5 mm.

9. The pneumatic tire according to claim 1, further comprising an intermediate rubber layer, which has a thickness of from 0.2 mm to 2.0 mm and is arranged between the carcass layer and the belt layer.

10. The pneumatic tire according to claim 1, further comprising an intermediate rubber layer arranged between the carcass layer and the belt layer, the intermediate rubber layer having a thickness of from 0.2 mm to 2.0 mm and a width equivalent to the belt width of the belt layer.

* * * * *